(12) United States Patent
Nishi

(10) Patent No.: US 6,778,474 B2
(45) Date of Patent: Aug. 17, 2004

(54) OPTICAL PICKUP DEVICE, OPTICAL DISC APPARATUS AND METHOD OF DETECTING TRACK DISCRIMINATION SIGNAL

(75) Inventor: Noriaki Nishi, Tokyo (JP)

(73) Assignee: Sony Corporation, Tokyo (JP)

( * ) Notice: Subject to any disclaimer, the term of this patent is extended or adjusted under 35 U.S.C. 154(b) by 639 days.

(21) Appl. No.: 09/750,377

(22) Filed: Dec. 27, 2000

(65) Prior Publication Data

US 2001/0036135 A1 Nov. 1, 2001

(30) Foreign Application Priority Data

Dec. 28, 1999 (JP) .......................................... P11-375339

(51) Int. Cl.$^7$ ................................................. G11B 7/00
(52) U.S. Cl. ................................. 369/44.26; 369/44.37; 369/112.05
(58) Field of Search .......................... 369/44.37, 44.26, 369/44.28, 44.41, 121, 112.03, 112.04, 112.05, 112.1, 112.15, 53.2, 53.28, 53.29

(56) References Cited

U.S. PATENT DOCUMENTS

| | | | | |
|---|---|---|---|---|
| 5,345,072 A | * | 9/1994 | Hayashi et al. .......... | 369/44.37 |
| 5,463,610 A | * | 10/1995 | Nishikawa .................. | 369/121 |
| 5,619,521 A | * | 4/1997 | Tanaka ..................... | 369/44.37 |
| 5,764,606 A | | 6/1998 | Fukumoto et al. | |
| 5,815,473 A | * | 9/1998 | Takahashi et al. ....... | 369/44.26 |
| 5,828,634 A | | 10/1998 | Ohno et al. | |
| 6,388,963 B1 | * | 5/2002 | Tanaka ..................... | 369/44.26 |
| 6,400,664 B1 | * | 6/2002 | Shimano et al. ......... | 369/44.37 |

FOREIGN PATENT DOCUMENTS

EP          0 459 420 A2       12/1991

\* cited by examiner

*Primary Examiner*—Thang V. Tran
(74) *Attorney, Agent, or Firm*—Bell, Boyd & Lloyd LLC

(57) ABSTRACT

A track discrimination signal can be generated without requiring the use of a large number of parts or a complex device configuration even when an optical recording medium adapted to the "land/groove recording system" such as a "DVD-RAM" is used. A main light spot is and auxiliary light spots are formed on an optical disc for signal recording and signal reproduction. The auxiliary light spots have respective distances different from that of the main light spot relative to an objective lens and formed at a position expressed by $$SPn/2,$$

where
S is the absolute value of the distance relative to the main spot in the normal direction of the recording tracks formed on the signal recording surface relative to the man spot,
P is the track pitch and
n is an integer.

40 Claims, 16 Drawing Sheets

OPTICAL PICKUP DEVICE, OPTICAL DISC APPARATUS AND METHOD OF DETECTING TRACK DISCRIMINATION SIGNAL

BACKGROUND OF THE INVENTION

1. Field of the Invention

This invention relates to an optical pickup device for writing an information signal to and/or reading an information signal from an optical recording medium, to an optical disc apparatus provided with such an optical pickup device and adapted to recording an information signal on and reproducing an information signal from an optical recording medium and also to a method of detecting a track discrimination signal for the purpose of detecting the position of a target recording track.

2. Prior Art

Various types of optical recording medium such as optical discs have been proposed along with optical disc apparatus adapted to recording an information signal on and reproducing an information signal from such an optical recording medium. An optical disc is typically used as optical recording medium with such an optical disc apparatus, although the system of using an optical disc may vary. An optical pickup device is typically used for an optical disc apparatus when writing an information signal to and reading an information signal from an optical disc.

An optical pickup device is normally provided with a light source such as a semiconductor laser and the flux of light emitted from the light source is converged and irradiated onto the signal recording surface of an optical disc by way of an objective lens. Such an optical pickup device is so configured that an information signal is written onto the signal recording surface by means of a flux of light irradiating the signal recording surface and an information signal is read out from the signal recording surface by detecting the flux of light irradiated onto and reflected by the signal recording surface.

The optical pickup device is designed to write or read information signals along the land sections or the groove sections formed helically or coaxially on the signal recording surface of the optical disc.

Meanwhile, efforts have been made to densely record information signals on an optical disc. For instance, a "DVD" (tradename) having a recording capacity of 4.7 GB which is about seven times as much as that of a "Compact Disc (CD)" (tradename), or 650 MB, is known, although the both discs have a same diameter of 120 mm.

The trend toward a higher recording density is also remarkable in the field of "rewritable discs" where information signals can be recorded and reproduced. Optical disc apparatus adapted to use a so-called "DVD-RAM" or a rewritable "DVD" have also been proposed. "DVD-RAMs" are used with a "land/groove recording system" designed to record information signals not only on the land sections or the groove sections but on both the land sections and the groove sections of the disc in order to densely record signals there.

However, rewritable high recording density discs using the "land/groove recording system" such as "DVD-RAMs" are accompanied by the following problems because both the land sections and the groove sections have a substantially same width.

In the case of an optical disc to be used with a "land recording system" for recording information signals only on the land sections that have a width greater than the groove sections, the phase of the tracking error signal (TE) and that of the sum signal (SUM) using a return beam (or a main spot when using a "three-spot method") is shifted by a "¼" period from each other as shown in FIG. 1 of the accompanying drawings, where a period refers to the time required to move from the head of a groove section to that of the next groove section.

Therefore, for tracking control of trying to reduce the tacking error signal (TE) to nil, there are two occasions that can make the tracking error signal (TE) equal to zero including one where the flux of light is irradiating a land section and one where the flux of light is irradiating a groove section and these two occasions can be discriminated by seeing the level of the sum signal (SUM).

The signal for discriminating the occasion where the flux of light is irradiating a land section and the occasion where the flux of light is irradiating a groove section is referred to as "track discrimination signal" or "cross track signal (CTS)". When the "land recording system" is used and the level of the sum signal (SUM) differs remarkably between when the flux of light is irradiating a land section and when it is irradiating a groove section, it is possible to use the AC component of the sum signal (AC-SUM) for the "track discrimination signal" as shown in FIG. 2 of the accompanying drawings. Referring to FIG. 2, the AC component of the sum signal is a track discrimination signal whose phase is shifted by 90 degrees from that of the tracking error signal.

Therefore, when the "land recording system" is used, it is possible to accurately find out the direction in which the light spot is moved and the number of tracks by which the light spot is shifted relative to the track to be used for the recording operation by using both the tracking error signal and the signal of the AC component of the sum signal even in a high speed seek operation. Thus, the operation of counting the number of tracks to be crossed and that of drawing the tracking servo can be conducted reliably.

However, on the other hand, when the "land/groove recording system" is used, both the land sections and the groove sections are normally made to have a substantially same width in order to optimize the recording/reproduction performance of the optical disc apparatus. As a result, the level of the above described sum signal (SUM) does not differ noticeably between when the flux of light is irradiating a land section and when it is irradiating a groove section as shown in FIG. 3 of the accompanying drawings so that it is no longer possible to generate a track discrimination signal from the sum signal.

Then, consequently it is highly difficult to access a given track instantaneously in a high speed seek operation that frequently takes place when using an external memory or a video recording/editing apparatus for professional applications and therefore the problem of a long access time occurs.

BRIEF SUMMARY OF THE INVENTION

In view of the above identified circumstances, it is therefore the object of the present invention to provide an optical pickup device that can generate a track discrimination signal without requiring the use of a large number of parts or a complex device configuration even when an optical recording medium adapted to the "land/groove recording system" such as a "DVD-RAM" is used and a method of detecting a track discrimination signal for such an optical pickup device as well as an optical disc apparatus adapted to comprising such an optical pickup device and use such a method of detecting a track discrimination signal.

According to the invention, the above object is achieved by providing an optical pickup device comprising:

a light source having at least a spot for emitting a flux of light;

an objective lens for converging the flux of light on the signal recording surface of an optical recording medium and irradiating it with the flux of light; and a photo-detection means for receiving the flux of light reflected from the signal recording surface of the optical recording medium;

the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot;

the auxiliary flux of light travelling a distance between the objective lens and the focal point different from the main flux of light;

the auxiliary spot being formed at a position expressed by $$S \approx Pn/2,$$

S being the absolute value of the distance relative to the main spot in the normal direction of the recording tracks formed on the signal recording surface relative to the man spot, P being the track pitch, n being an integer.

For the purpose of the invention, the expression "track pitch (P)" refers to "the distance between a land section and the next land section" (or "the distance between a groove section and the next groove section") even in the case of recording information signals both on the land sections and the groove sections on an optical disc by using the "land/groove system".

In another aspect of the invention, there is provided an optical disc apparatus comprising:

a rotary drive mechanism adapted to rotate an optical recording medium removably fitted thereto and having land sections and groove sections, both being capable of recording information signals;

an optical pickup device fitted to the rotary drive mechanism in order to write an information signal to and reading an information signal from the optical recording medium being rotated by the rotary drive mechanism;

a signal processing circuit for generating a replay signal on the basis of the output signal of the optical pickup device; and a servo circuit for controlling the position of the objective lens of the optical pickup device on the basis of the output signal of the optical pickup device;

the optical pickup device including:

a light source having at least a spot for emitting a flux of light;

an objective lens for converging the flux of light on the signal recording surface of an optical recording medium and irradiating it with the flux of light; and a photo-detection means for receiving the flux of light reflected from the signal recording surface of the optical recording medium;

the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot;

the auxiliary flux of light travelling a distance between the objective lens and the focal point different from the main flux of light;

the auxiliary spot being formed at a position expressed by $$S \approx Pn/2,$$

S being the absolute value of the distance relative to the main spot in the normal direction of the recording tracks formed on the signal recording surface relative to the man spot, P being the track pitch, n being an integer.

In still another aspect of the invention, there is provided a method of detecting a track discrimination signal in an operation of reading an information signal from an optical recording medium removably fitted to a rotary drive mechanism adapted to rotate the optical recording medium and having land sections and groove sections, both being capable of recording information signals, by means of an optical pickup device;

said optical pickup device comprising:

a light source having at least a spot for emitting a flux of light;

an objective lens for converging the flux of light on the signal recording surface of an optical recording medium and irradiating it with the flux of light; and a photo-detection means for receiving the flux of light reflected from the signal recording surface of the optical recording medium;

the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot;

the auxiliary flux of light travelling a distance between the objective lens and the focal point different from the main flux of light;

the auxiliary spot being formed at a position expressed by $$S \approx Pn/2,$$

S being the absolute value of the distance relative to the main spot in the normal direction of the recording tracks formed on the signal recording surface relative to the man spot, P being the track pitch, n being an integer;

the track discrimination signal being generated on the basis of the output signal of the photo-detection means.

Thus, with an optical pickup device, an optical disc apparatus and a method of detecting a track discrimination signal according to the invention, it is possible to reliably obtain track discrimination signal even when recording a signal for "land/groove recording", using a "land/groove recording medium".

Therefore, conventional control methods such as those using the operation of counting the number of recording tracks to be crossed at seek and that of drawing the tracking servo can be applied reliably to "land/groove recording".

Thus, according to the invention, it is now possible to provide an optical pickup device and an optical disc apparatus adapted to the "land/groove recording system" that typically uses a "DVD-RAM" and realized by using a limited number of parts and a simple device configuration even when an optical recording medium.

Additionally, according to the invention, it is possible to provide an optical pickup device and an optical disc apparatus that can be used not only with "DVD-RAMs" but also with various optical discs conforming to different standards for "land/groove recording" and realized by using a limited number of parts and a simple device configuration.

DETAILED DESCRIPTION OF THE INVENTION

Now, the present invention will be described by referring to the accompanying drawings that illustrate preferred embodiments of the invention.

An optical disc apparatus according to the invention and comprising an optical pickup device also according to the invention is adapted to record an information signal on and reproduce an information signal from an optical disc operating as optical recording medium that can be selected from optical discs of a plurality of different types. For instance, it can operates for "land/groove recording", using an optical disc adapted to "land/groove recording" such as a so-called "DVD-RAM".

Figure 4:
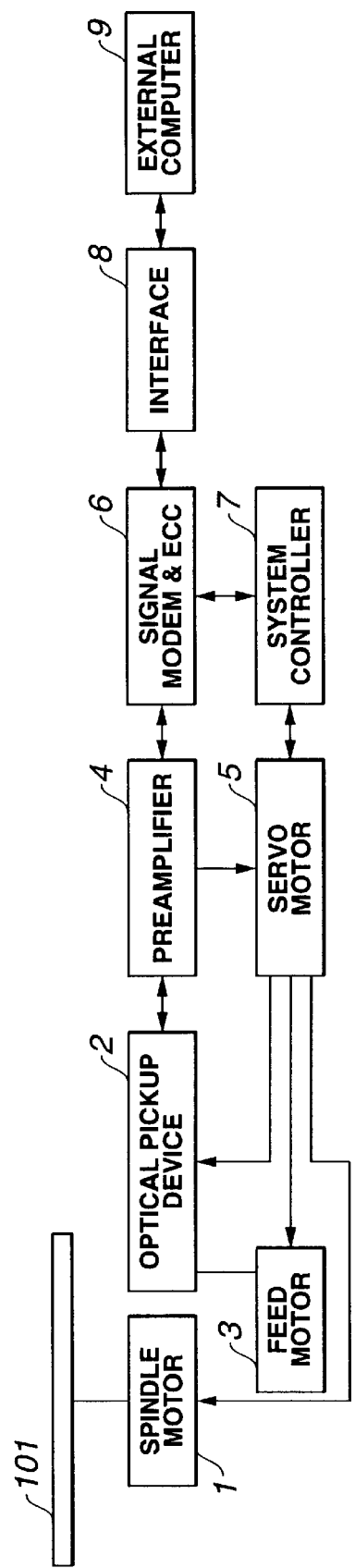
FIG. 4 is a schematic block diagram of an embodiment of optical disc apparatus according to the invention.

Referring to FIG. 4, an optical disc apparatus according to the invention comprises a spindle motor 1 that is a rotary drive means for driving an optical disc 101 operating as optical recording medium to rotate. A disc table (not shown) is fitted to the drive shaft of the spindle motor 1 so that, as an optical disc 101 is placed on the disc table, it is driven to rotate with the disc table. The spindle motor 1 is controlled by a servo control circuit 5 and a system controller 7 so as to make it rotate with a predetermined number of revolutions per unit time.

The optical pickup device 2 writes an information signal to and reads an information signal from the optical disc 101 that is being driven to rotate by the spindle motor 1. The optical pickup device 2 is driven by a feed motor 3 to move in a radial direction of the optical disc 101 placed on the disc table. The optical pickup device 2 and the feed motor 3 are also controlled by the servo control circuit 5 for operation.

The optical pickup device 2 is adapted to irradiate the signal recording surface of the optical disc 101 with a flux of light and reads an information signal from the signal recording surface by detecting the flux of light reflected from the signal recording surface. The signal read out from the optical disc 101 by the optical pickup device 2 is amplified by a preamplifier 4 and then sent to a signal modulation/demodulation and ECC block 6 and the servo control circuit 5. The signal modulation/demodulation and ECC block 6 modulates, demodulates and/or adds an ECC (error correction code) to the signal depending on the type of the optical recording medium from which the signal is reproduced. The signal modulation/demodulation and ECC block 6 also generates a focussing error signal, a tracking error signal, track discrimination signal and an RF signal on the basis of the signal fed to it. The servo control circuit 5 controls the optical pickup device 2 on the basis of the focussing error signal, the tracking error signal and the track discrimination signal generated by the signal modulation/demodulation and ECC block 6.

The signal demodulated by the signal modulation/demodulation and ECC block 6 is typically sent to an external computer 9 by way of an interface 8 if the signal represents a data to be stored in the data storage of the computer. If such is the case, the external computer 9 can receive the signal recorded on the optical disc 101 as reproduction signal.

The optical pickup device 2 is also adapted to irradiate the signal recording surface of the optical disc 101 that is driven to rotate with a flux of light according to the signal transmitted from the signal modulation/demodulation and ECC block 6. Then, an information signal is written to the signal recording surface of the optical disc 101 as a result of the irradiation of the flux of light.

Figure 5:
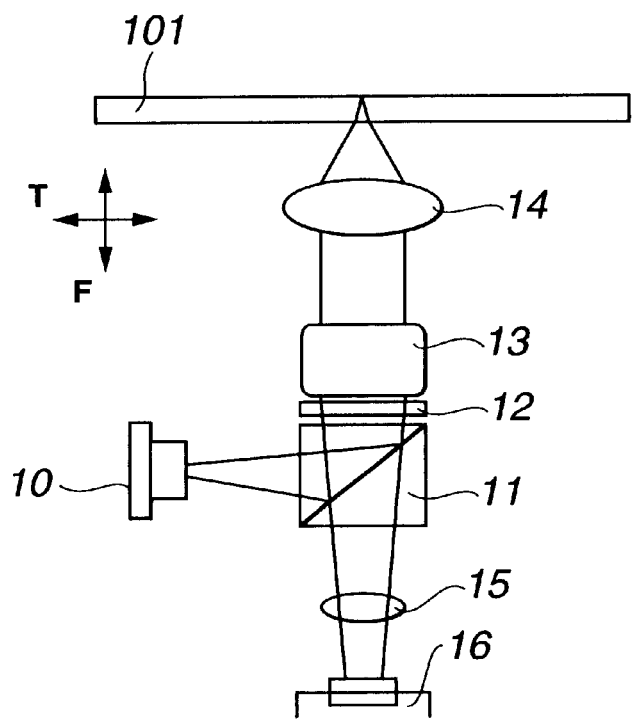
FIG. 5 is a schematic lateral view of an embodiment of optical pickup device according to the invention.
Figure 6:
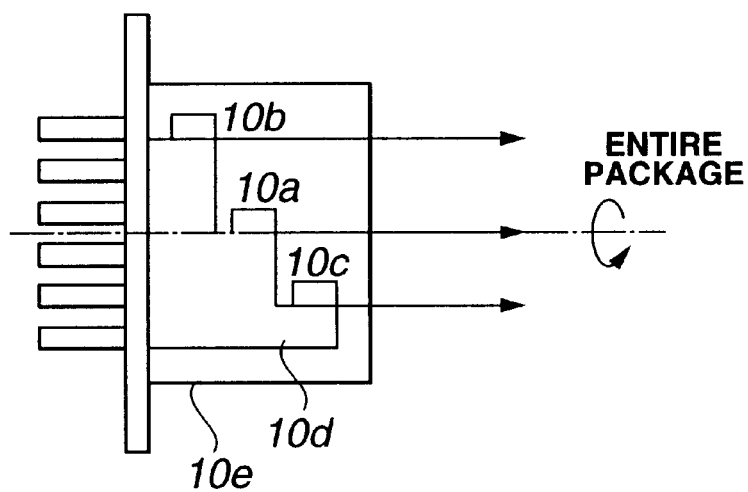
FIG. 6 is a schematic lateral view of the light source section of the embodiment of optical pickup device of FIG. 5.

As shown in FIG. 5, the optical pickup device 2 is provided with a light source section 10 that is rotatable around its optical axis. The light source section 10 has at least a spot for emitting a flux of light. In the case of this embodiment, it has three light emitting spots 10a, 10b, 10c as shown in FIG. 6.

When reading an information signal from the optical recording medium where signals are recorded by "land/groove recording", the fluxes of light emitted from the light emitting spots 10a, 10b, 10c are made to enter a polarized beam splitter prism 11 and substantially all the quantity of light of the fluxes of light is reflected by the dielectric multilayer film of the polarized beam splitter prism 11 due to the fact that the fluxes of light are in an S-polarized state relative to the dielectric multilayer film before they enter a ¼ wave plate 12. The fluxes of light that enter the ¼ wave plate are brought into a circularly polarized state as they pass through the ¼ wave plate 12 and then collimated by a collimator lens 13 before entering an objective lens 14.

The polarized beam splitter prism 11 typically comprises a pair of triangular prisms that are bonded to each other to produce a cube and a dielectric multilayer film formed between the triangular prisms typically by means of evaporation or sputtering. Of the fluxes of light that enter the polarized beam splitter prism 11, the P-polarized components as viewed from the dielectric multilayer film are transmitted through the dielectric multilayer film, whereas the S-polarized components as viewed from the dielectric multilayer film are reflected by the dielectric multilayer film.

Figure 1:
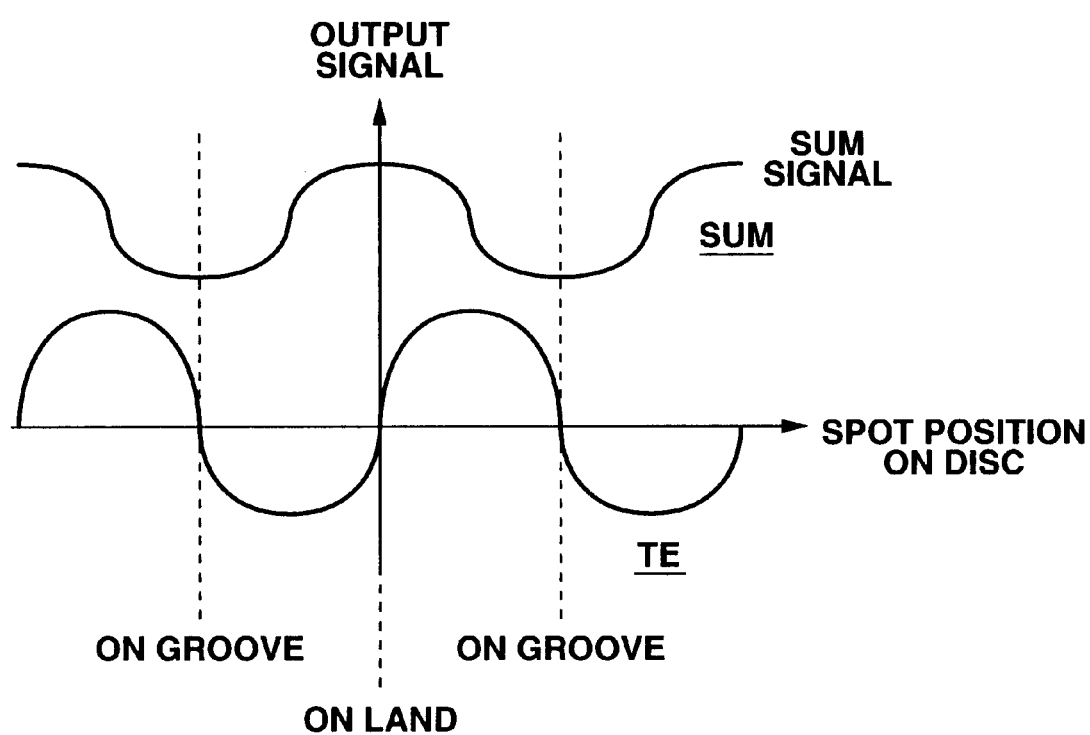
FIG. 1 is a graph showing the relationship between a tracking error signal and a corresponding sum signal of a conventional "land recording system"
Figure 2:
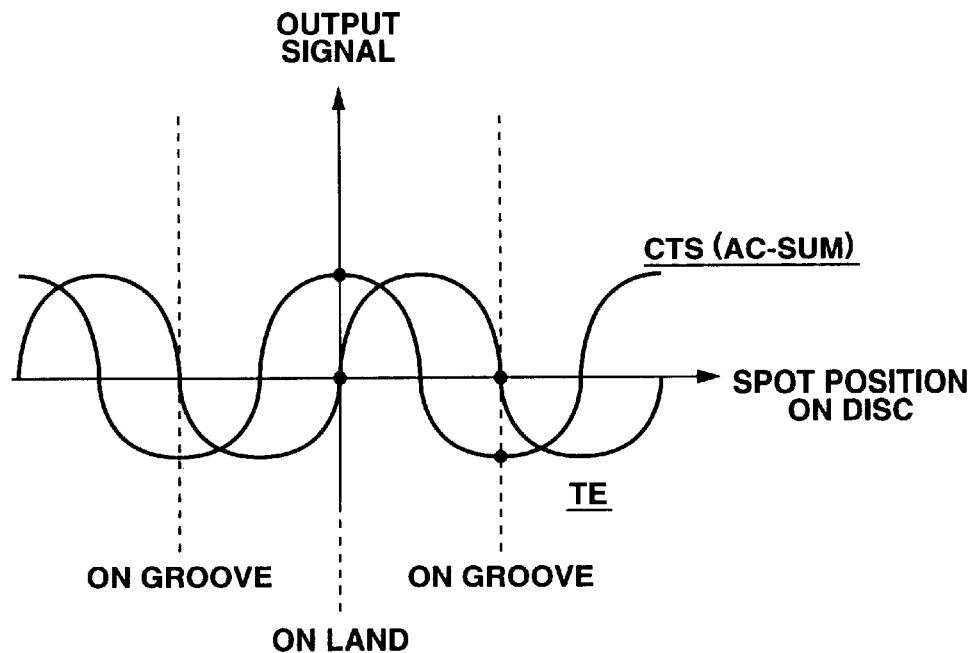
FIG. 2 is a graph showing the relationship between a tracking error signal and a corresponding track discrimination signal of a conventional "land recording system"
Figure 3:
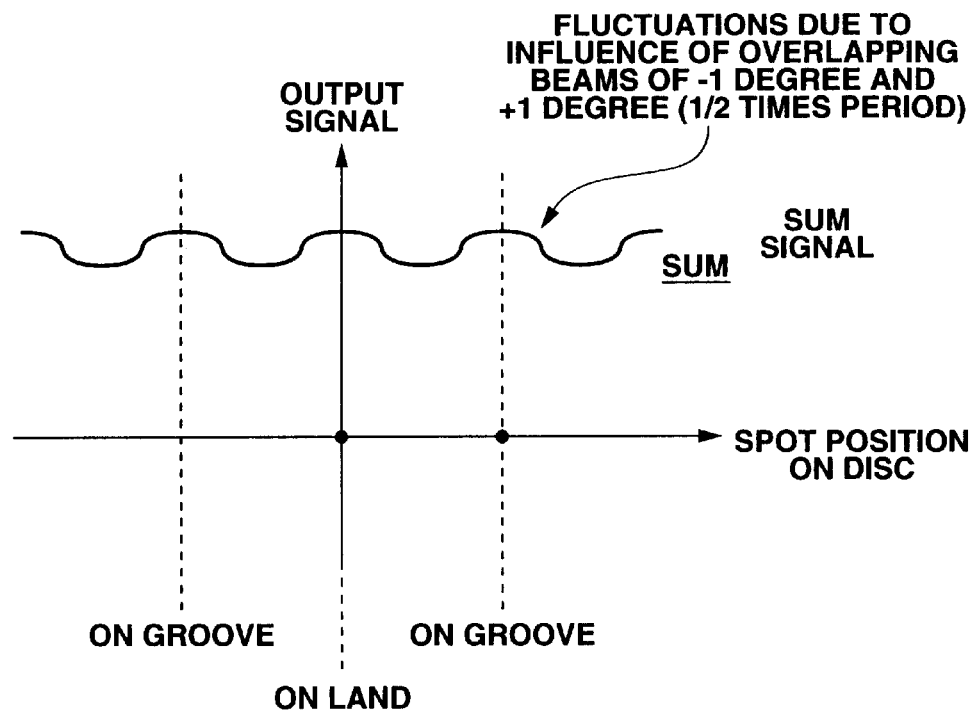
FIG. 3 is a graph showing a sum signal of a conventional "land recording system"

The objective lens 14 is supported by a two-axial actuator (not shown) in such a way that it is movable in the focussing direction as indicated by arrow F in FIG. 2 and also in the tracking direction as indicated by arrow T in FIG. 5. Each of the fluxes of light entering the objective lens 14 is converged onto the signal recording surface of the optical disc 101.

However, note that only one of the fluxes of light emitted from the three light emitting spots 10a, 10b, 10c is focussed on the signal recording surface, while the remaining two fluxes of light are defocussed relative to the signal recording surface.

The three fluxes of light reflected by the signal recording surface after irradiating the latter are then sent back to the polarized beam splitter prism 11 in a linearly polarized state after passing through the objective lens 14, the collimator lens 13 and the ¼ wave plate 12. Substantially all the quantity of light of the reflected fluxes of light are made to pass through the dielectric multilayer film due to the fact that the reflected fluxes of light are in a P-polarized state relative to the dielectric multilayer film. Then, they are diverted from the light path leading back to the light source section 10 and made to pass the light path leading to a photo-detection element 16 by way of a multi-lens 15. The multi-lens 15 is a lens combining a concaved surface and a cylindrical surface and adapted to increase the distance to the focal point of the reflected fluxed of light and give rise to astigmatism to them.

The optical components of the optical pickup device 2 are individually mounted and supported in an optical block (not shown).

As shown in FIG. 6, the light source section 10 comprises a main light emitting spot 10a for emitting a main flux of light adapted to form a main spot on the signal recording surface of the optical disc 101 for the purpose of recording/reproducing an information signal, a first auxiliary light emitting spot 10b for emitting a first auxiliary flux of light adapted to be focussed and form a first auxiliary spot at a position short of the signal recording surface of the optical disc 101 when the main spot is in focus on the signal recording surface and a second auxiliary light emitting spot 10c for emitting a second auxiliary flux of light adapted to be focussed and form a second auxiliary spot at a position beyond the signal recording surface of the optical disc 101 when the main spot is in focus on the signal recording surface of the optical disc 101. Thus, each of the auxiliary fluxes of light has a distance from its light emitting spot to its focussed position that is different from the counterpart of the main flux of light. Additionally, the main spot and each of the auxiliary spots are separated from each other on the signal recording surface of the optical disc 101. The main light emitting spot 10a and the auxiliary light emitting spots 10b, 10c are supported on a holding table 10d and contained in a package 10e.

The light source section 10 is adapted to change the positional relationship of each of the auxiliary spots and the recording track being used on the signal recording surface of the optical disc 101 without modifying the focussed position of the main spot as the entire package 10e is rotated around the optical axis of the light source section 10. Additionally, each of the auxiliary spots is formed at a position where the approximate equation below holds true:

$$S \approx Pn/2$$

where

S is the absolute value of the distance relative to the main spot in the normal direction of the recording tracks formed on the signal recording surface relative to the main spot, P is the track pitch and n is an integer.

For the purpose of the invention, the expression "track pitch (P)" refers to "the distance between a land section and the next land section" (or "the distance between a groove section and the next groove section") even in the case of recording information signals both on the land sections and the groove sections on an optical disc by using the "land/groove system".

Figure 7:
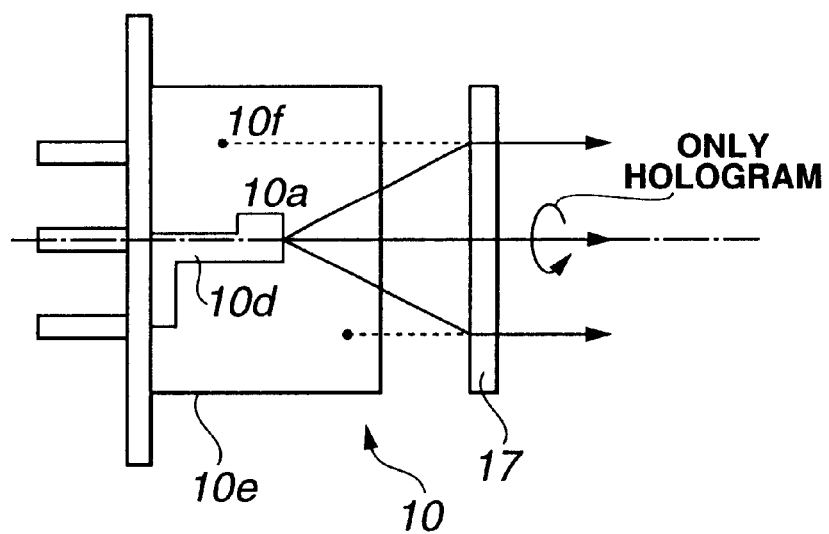
FIG. 7 is a schematic lateral view of another light source section that can be used for the embodiment of optical pickup device of FIG. 5.
Figure 8:
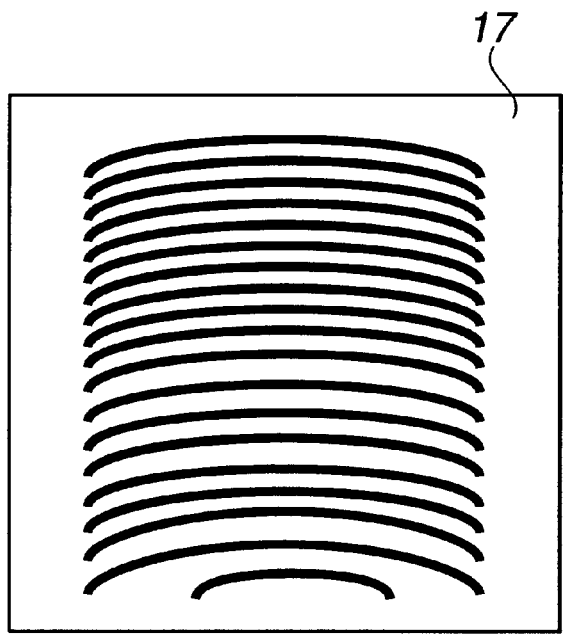
FIG. 8 is a schematic front view of the optical diffraction element of the light source section of FIG. 7.
Figure 9:
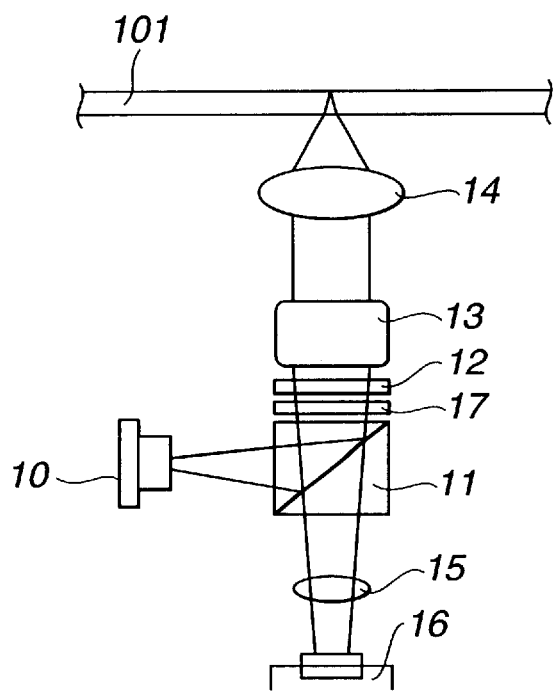
FIG. 9 is a schematic lateral view of another embodiment of optical pickup device according to the invention.

The light source section 10 may alternatively comprise a light emitting spot 10a and an optical diffraction element 17 as shown in FIG. 7. As shown in FIG. 8, the optical diffraction element 17 is realized in the form of a hologram pattern having power (hologram element). The flux of light emitted from the light emitting spot 10a and diffracted by the diffraction element 17 is separated into a zero order diffracted light beam and ± first order diffracted light beams. The light beam of 0 degree is equivalent to the main flux of light emitted from the light emitting spot 10a and proceeds straight, whereas the light beam of +1 degree is equivalent to the first auxiliary flux of light that is emitted not from the light emitting spot 10a but from a virtual light emitting spot 10f displaced from the light emitting spot 10a and the light beam of −1 degree is equivalent to the second auxiliary flux of light that is emitted not from the light emitting spot 10a but from the virtual light emitting spot 10g also displaced from the light emitting spot 10a. Thus, each of the auxiliary fluxes of light has a distance from its light emitting spot to its focussed position that is different from the counterpart of the main flux of light. Additionally, the main spot and each of the auxiliary spots are separated from each other on the signal recording surface of the optical disc 101.

The light source section 10 is adapted to change the positional relationship of each of the auxiliary spots and the recording track being used on the signal recording surface of the optical disc 101 without modifying the focussed position of the main spot as the optical diffraction element 17 is rotated around the optical axis of the light source section 10. Additionally, each of the auxiliary spots is formed at a position where the approximate equation below holds true:

$$S \approx Pn/2$$

where

S is the absolute value of the distance relative to the main spot in the normal direction of the recording tracks formed on the signal recording surface relative to the main spot, P is the track pitch and n is an integer.

The optical diffraction element 17 may be formed by a polarizing hologram element. If such is the case, the optical diffraction element 17 may be arranged not between the light source section 10 and the polarized beam splitter prism 11 as described above but between the polarized beam splitter prism 11 and the ¼ wave plate 12. A polarizing hologram element can be so arranged that it operates as hologram relative to the flux of light directed toward the optical disc but it does not exert any optical effect on the flux of light coming back from the optical disc.

Figure 10:
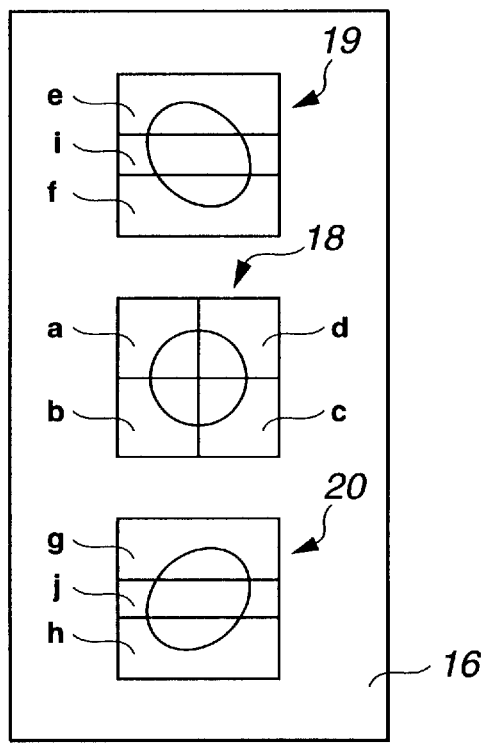
FIG. 10 is a schematic front view of the light receiving section of the photo-detection element of an optical pickup device according to the invention, illustrating its configuration.

As shown in FIG. 10, the photo-detection element 9 comprises a main light receiving section 18 for receiving the main flux of light coming back from the main spot on the signal recording surface, a first auxiliary light receiving section 19 for receiving the first auxiliary flux of light coming back from the first auxiliary spot on the signal recording surface and a second auxiliary light receiving section 20 for receiving the second auxiliary flux of light coming back from the second auxiliary spot on the signal recording surface.

The main light receiving section 18 by turn comprises four light receiving elements a, b, c, d arranged radially relative to a center in order to detect a focus error signal produced by a so-called "astigmatic method". In the main light receiving section 18, the light receiving elements a and c are arranged diagonally relative to each other as viewed from the center of the main light receiving section 18. Similarly, the light receiving elements b and d are arranged diagonally relative to each other as viewed from the center of the main light receiving section 18. The four light receiving elements a, b, c, d independently output respective photo-detection signals a, b, c, d.

Each of the auxiliary light receiving sections 19, 20 comprises three light receiving elements, which are denoted by e, i, f for the auxiliary light receiving section 19 and by h, j, g for the auxiliary light receiving section 20. In the auxiliary light receiving sections 19, 20, the light receiving elements i, j are sandwiched respectively by the light receiving elements e, f and light receiving elements h, g. The six light receiving elements e, i, f, h, j, g independently output respective photo-detection signals e, i, f, h, j, g.

The photo-detection signals output from the photo-detection element 16 are subjected to current-voltage conversion by an amplifier (not shown) typically arranged on the semiconductor substrate of the photo-detection element 16 and then sent to an arithmetic circuit that is connected to the light receiving sections 18, 19, 20 and may be located either inside or outside the photo-detection element. The arithmetic circuit arithmetically generates a focus error signal FE, a tracking error signal TE, a track discrimination signal CTS and an RF signal in a manner as described below.

Firstly, the track discrimination signal CTS is arithmetically generated by using the formula shown below.

$$CTS=[(e+f)-i]-[(g+h)-j]$$

The focus error signal FE, the tracking error signal TE and the RF signal are arithmetically generated by using the respective formulas shown below. Note that the focus error signal FE is generated by a so-called "astigmatic method" and the tracking error signal is generated by a so-called "differential push-pull method".

$$FE=(a+c)-(b+d);$$

$$TE=[(a+d)-(b+c)]-K \cdot [(e-f)+(g-h)]$$

where ∵K is a coefficient; and $$RF=a+b+c+d$$

Now, the principle underlying the operation of detection of a track discrimination signal according to the invention will be described below.

According to the invention, when the main spot is in focus on the signal recording surface and capable of recording/reproducing an information signal, the auxiliary spots are defocussed on the signal recording surface due to the fact that the focussed positions of the auxiliary spots are differentiated from that of the main spot.

As the light spots on the optical disc cross a recording track under this condition, the main spot shows an intensity distribution of the reflected flux of light that is uniform and even both on the land section and the groove section because it is in focus, whereas each of the aux spots shows an intensity distribution of the reflected flux of light that is remarkably differentiated between the land section and the groove section as a function of the change in the interference of the wave surface because it is defocussed. Therefore, each track of the optical disc can be discriminated by using the changes in the intensity distributions of the reflected fluxes of light coming back from the auxiliary spots.

FIGS. 11 through 16 illustrate some of the results obtained by computing the intensity distribution and the phase distribution of the diffracted light on the objective lens iris when an optical disc of "DVD-RAM" with a recording capacity of 4.7 GB is used with an optical pickup device according to the invention.

Some of the parameters used for the above computations include the following. The wavelength of the fluxes of light emitted by the optical pickup device is 660 nm. The numerical aperture (NA) of the objective lens is 0.60. The tangential rim intensity is 0.55 and the radial rim intensity is 0.45. The recording tracks on the optical disc is arranged at a pitch of 1.23 μm and the reciprocal phase depth of the groove sections is (λ/6). Both the land sections and the groove sections have an equal width of (0.615 μm).

Figure 11:
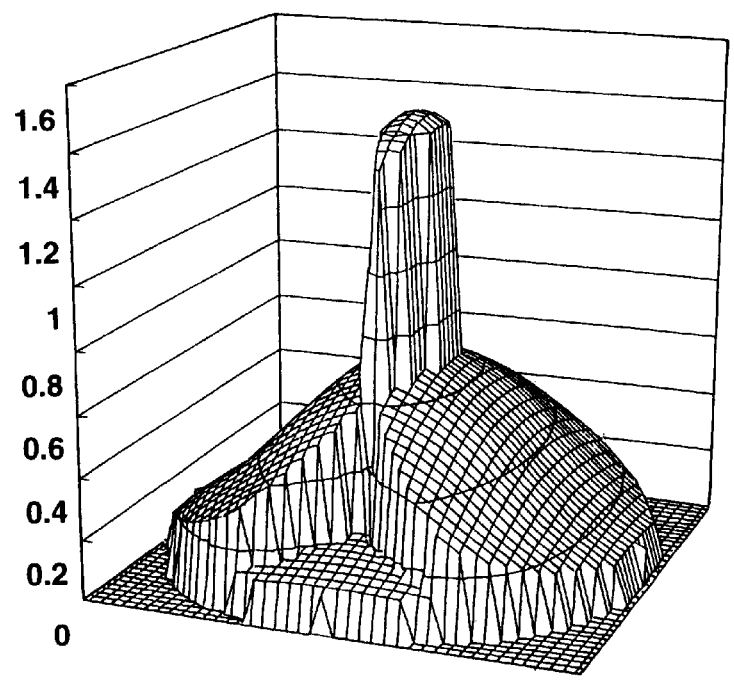
FIG. 11 is a graph showing the outcome of the computations conducted for determining the intensity distribution of the diffracted light on an optical disc, or a "DVD-RAM", from which signals are reproduced by means an optical pickup device and where the light spot for reproducing a signal is located on a groove section and defocussed by −0.5 m on the optical disc.
Figure 12:
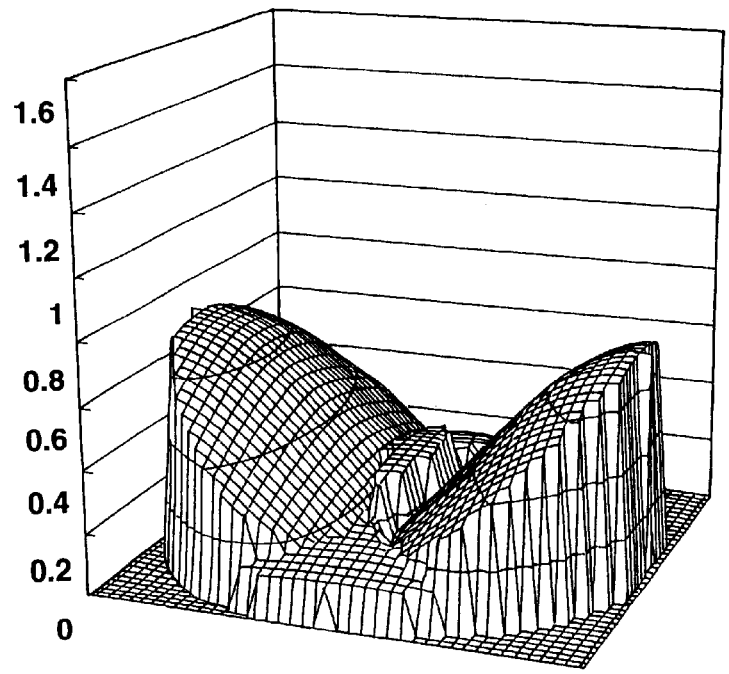
FIG. 12 is a graph showing the outcome of the computations conducted for determining the intensity distribution of the diffracted light on an optical disc, or a "DVD-RAM", from which signals are reproduced by means an optical pickup device and where the light spot for reproducing a signal is located on a land section and defocussed by −0.5 m on the optical disc.
Figure 13:
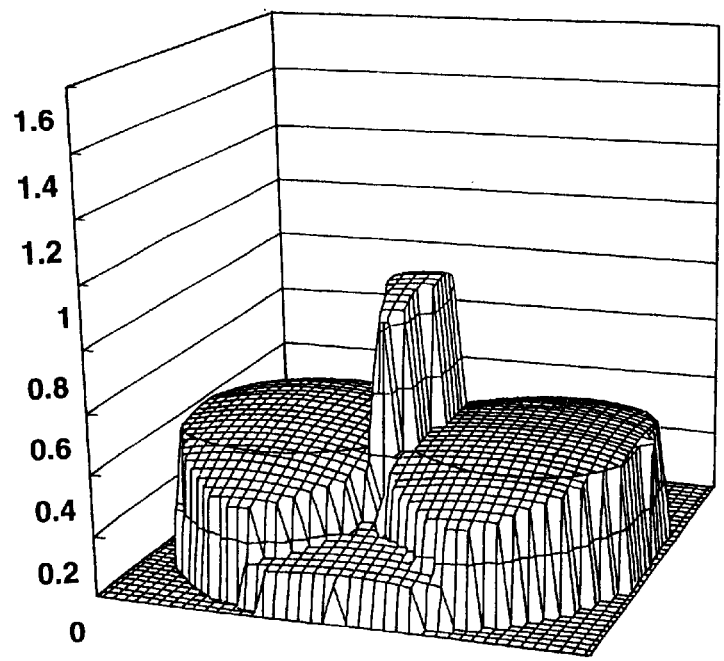
FIG. 13 is a graph showing the outcome of the computations conducted for determining the intensity distribution of the diffracted light on an optical disc, or a "DVD-RAM", from which signals are reproduced by means an optical pickup device and where the light spot for reproducing a signal is located on a groove section and not defocussed at all.
Figure 14:
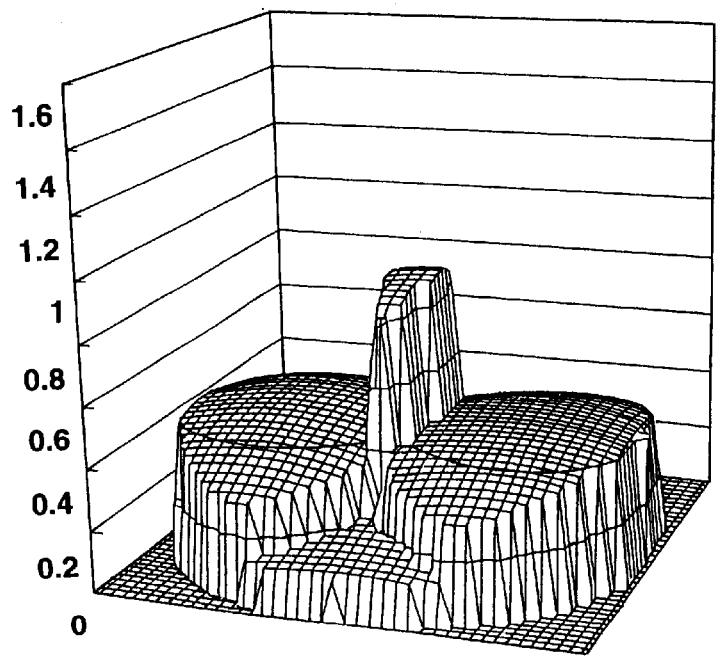
FIG. 14 is a graph showing the outcome of the computations conducted for determining the intensity distribution of the diffracted light on an optical disc, or a "DVD-RAM", from which signals are reproduced by means an optical pickup device and where the light spot for reproducing a signal is located on a land section and not defocussed at all.
Figure 15:
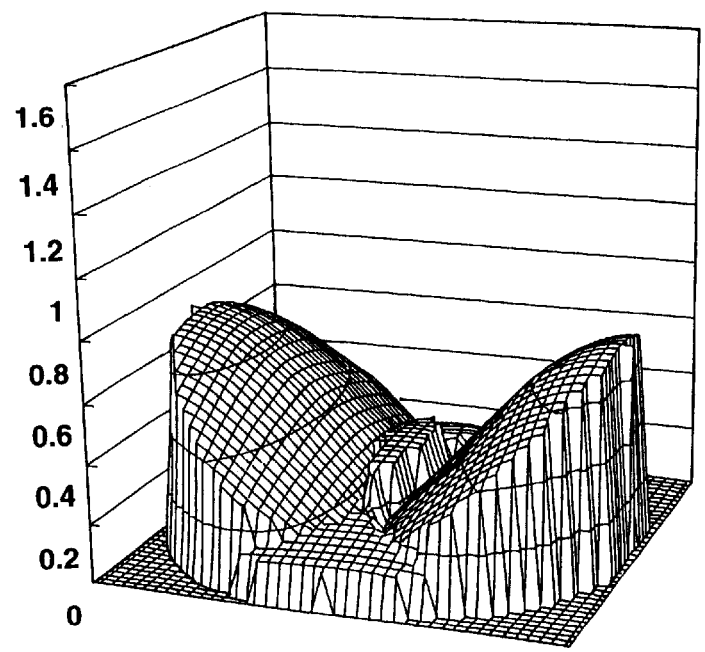
FIG. 15 is a graph showing the outcome of the computations conducted for determining the intensity distribution of the diffracted light on an optical disc, or a "DVD-RAM", from which signals are reproduced by means an optical pickup device and where the light spot for reproducing a signal is located on a groove section and defocussed by +0.5 m on the optical disc.
Figure 16:
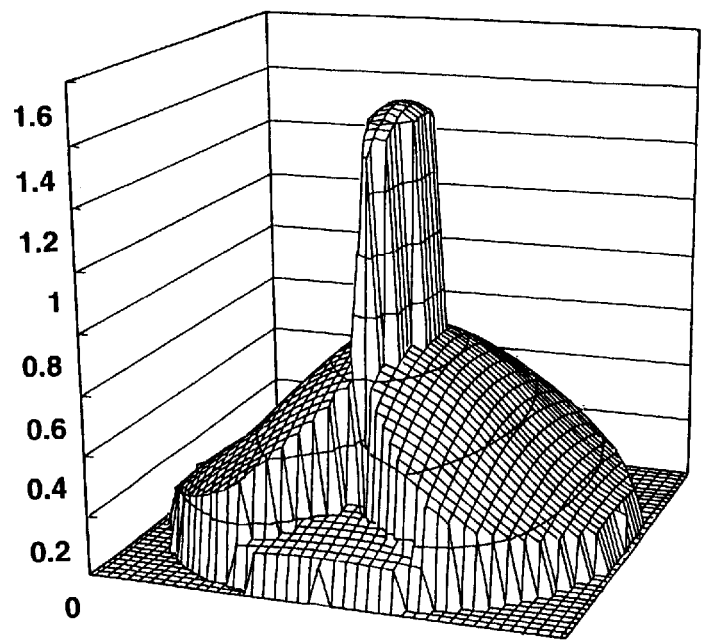
FIG. 16 is a graph showing the outcome of the computations conducted for determining the intensity distribution of the diffracted light on an optical disc, or a "DVD-RAM", from which signals are reproduced by means an optical pickup device and where the light spot for reproducing a signal is located on a land section and defocussed by +0.5 m on the optical disc.

Of FIGS. 11 through 16, FIGS. 11, 13 and 15 show the intensity distributions of the reflected fluxes of light obtained when the light spots are located on a groove section and FIGS. 12, 14 and 16 show those obtained when the light spots are located on a land section. FIGS. 13 and 14 show the results obtained in an in focus state, whereas FIGS. 11 and 12 show the results obtained in a state of being defocussed by −0.5 μm on the optical disc and FIGS. 15, 16 show the results obtained in a state of being defocussed by +0.5 μm on the optical disc.

With the "land/groove recording system" of recording information signals both on land sections and groove sections, the pitch of arrangement of tracks is large relative to the diameter of the light spots because it corresponds to the distance from "a land section to the next land section" or the distance from "a groove section to the next groove section" so that the manner in which the diffracted beams of light overlaps each other on the optical disc of this system largely differs from the that of the "land recording system" or that of the "groove recording system".

Figure 17:
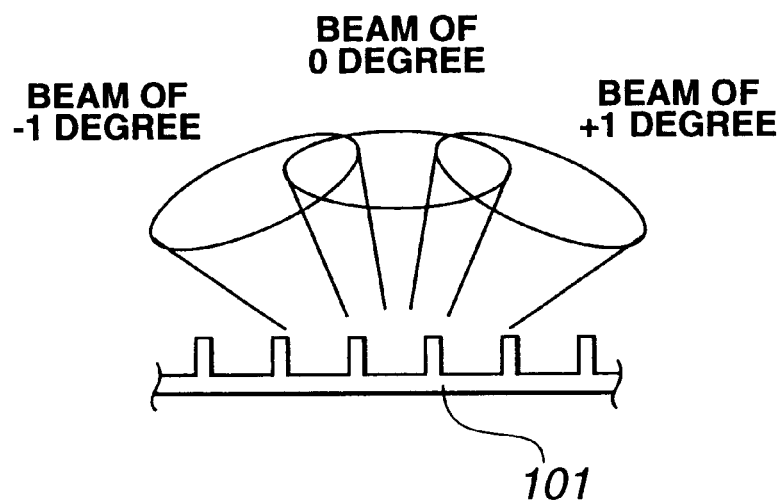
FIG. 17 is a schematic lateral view of part of an optical disc being used for conventional "land recording", illustrating the diffracted light.
Figure 18:
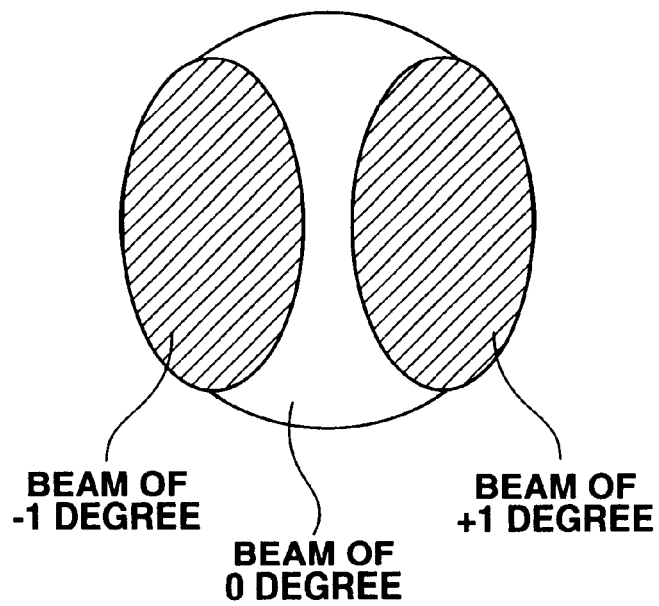
FIG. 18 is a schematic front view of part of an optical disc being used for conventional "land recording", illustrating the light diffracted by the optical disc and returned to the optical pickup device operating with it.
Figure 19:
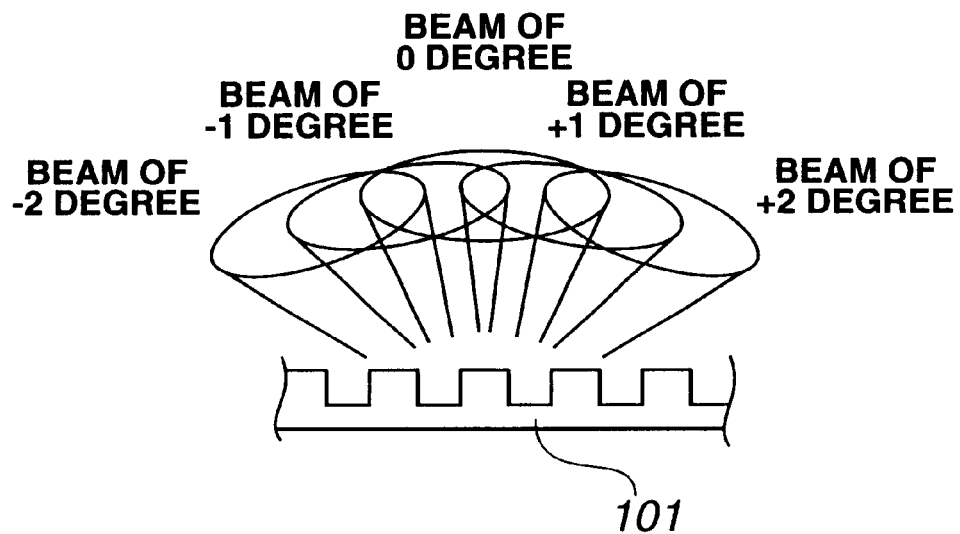
FIG. 19 is a schematic lateral view of part of an optical disc being used for "land/groove recording" in an optical disc apparatus according to the invention, illustrating the light diffracted by the optical disc.
Figure 20:
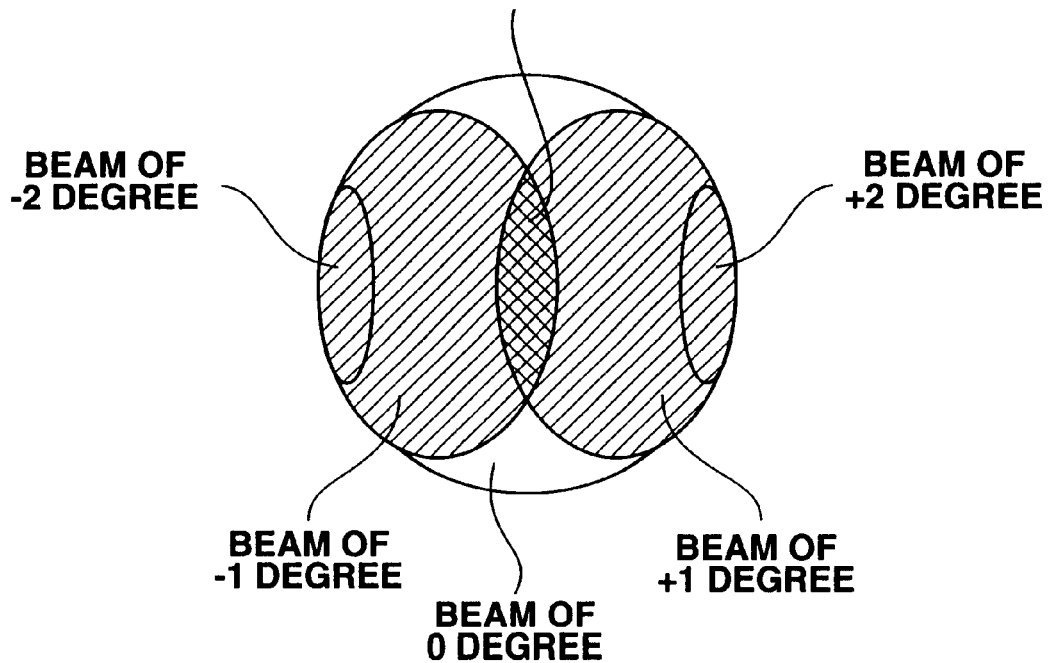
FIG. 20 is a schematic front view of part of an optical disc being used for "land/groove recording" in an optical disc apparatus according to the invention, illustrating the light diffracted by the optical disc and returned to the optical pickup device.

More specifically, when an information signal is reproduced from an optical disc by means of the conventional "land recording system" as shown in FIG. 17, the zero order diffracted light beam and the ± first order diffracted light beams normally do not overlap each other in a central area of the iris as shown in FIG. 18. On the other hand, when the "land/groove recording system" is used as shown in FIG. 19, the pitch of track arrangements is such that the zero order diffracted light beam and the + first order diffracted light beams frequency overlap each other in a central area of the iris as shown in FIG. 20. In each of FIGS. 11, 13, 14 and 16, the projection at the center of the reflected flux of light represents a high intensity arc where such overlap occurs.

As clearly seen from FIGS. 13 and 14, in an in focus state, the intensity distribution of the reflected flux of light coming from a light spot does not change if it is on a land section or on a groove section. This is the reason why the sum signal cannot be used for the track discrimination signal when the "land/groove recording system" is used as pointed out earlier. To the contrary, in a defocussed state, as shown in FIGS. 11, 12, 15 and 16, the intensity distribution of the reflected flux of light coming from a light spot changes depending on if it is on a land section or on a groove section and the polarity of the change of the intensity distribution is inverted depending on the sense of defocussing.

Figure 21:
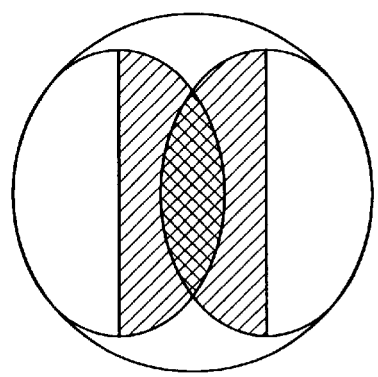
FIG. 21 is a schematic front view of part of a "land/groove recording medium" being used with an optical pickup device according to the invention, illustrating the intensity distribution of the reflected flux of light coming from the light spot on the recording medium that is defocussed in a direction.
Figure 22:
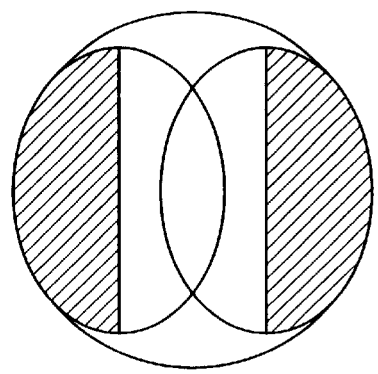
FIG. 22 is a schematic front view of part of a "land/groove recording medium" being used with an optical pickup device according to the invention, illustrating the intensity distribution of the reflected flux of light coming from the light spot on the recording medium that is defocussed in a direction opposite to that of FIG. 21.
Figure 23:
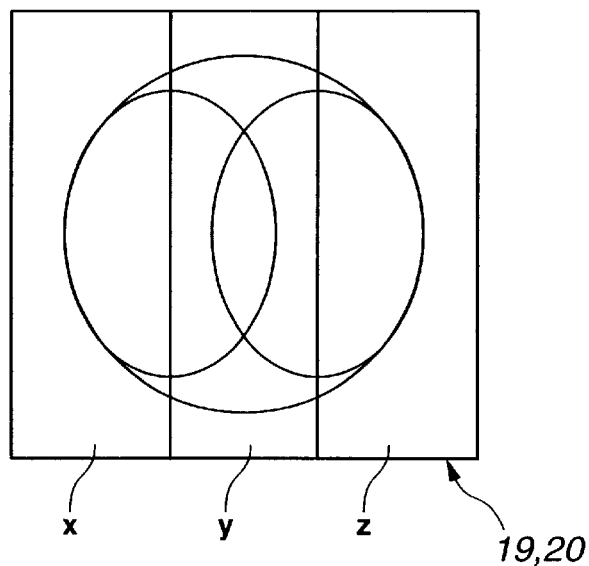
FIG. 23 is a schematic front view of the light receiving section receiving the reflected flux of light reflected coming from the light spot defocussed on the "land/groove recording medium" being used with an optical pickup device according to the invention.

FIG. 21 schematically illustrates a change in the intensity distribution where the intensity is raised in a central area. On the other hand, FIG. 22 schematically illustrates a change in the intensity distribution where the intensity is raised in peripheral areas. Such changes in the intensity distribution can be detected by using a light receiving section as shown in FIG. 23 where three light receiving elements x, y, z are arranged in parallel so that the flux of light coming back from a light spot is divided into three when it is received by the light receiving section and conducting an arithmetic operation using the formula below;

$$(y) \text{ or } (x+z) \text{ or } (x+z)-y,$$

where x, y and z are the respective photo-detection outputs of the light receiving elements x, y and z.

Figure 24:
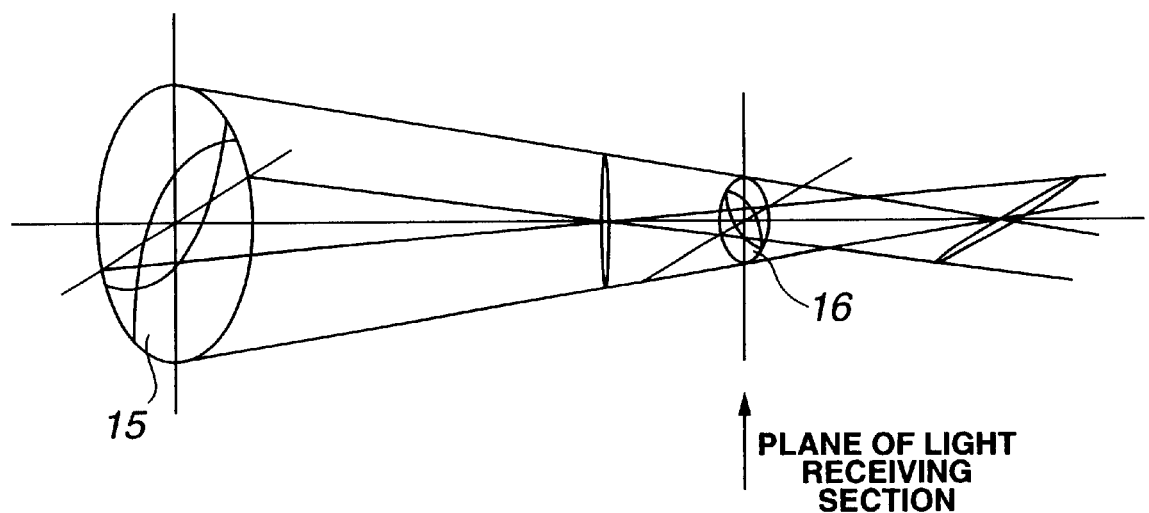
FIG. 24 is a schematic perspective view of a flux of light, illustrating a changing cross sectional view of thereof by an "astigmatic method"

Meanwhile, when detecting the focus error signal by means of an "astigmatic method", the reflected flux of light is made to show astigmatism in a direction inclined by 45 degrees from the direction of the diffraction pattern produced by the recording track by using a multi-lens 15 as shown in FIG. 24. Then, the main flux of light is focussed on the optical disc, the spot formed on the light receiving element by the reflected flux of light is substantially circular and focal lines are produced along the opposite ends of the focus drawing range so that a substantially S-shaped focus error curve as shown in FIG. 24 is obtained if the light receiving section 16 of the photo-detection element 16 is placed substantially at the middle of the focal lines formed as a result of astigmatism.

Figure 25:
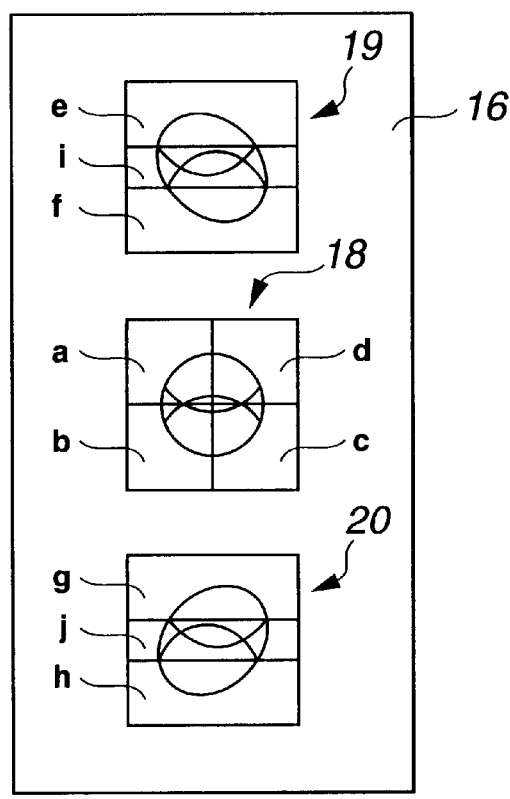
FIG. 25 is a schematic front view of the photo-detection element of an optical pickup device according to the invention, illustrating the light spots on the element.

FIG. 25 illustrates the diffraction patterns of the reflected fluxes of light on the iris of the objective lens and those on the light receiving section that are obtained when the main flux of light is in focus on the optical disc. As shown in FIG. 25, spots are formed on the light receiving section with patterns that are inverted in the direction in which the fluxes of light are focussed before getting to the light receiving section out of the directions that are perpendicular to the direction parallel to the generatrix of the cylindrical surface of the multi-lens.

Therefore, as seen from FIGS. 10 and 25, a track discrimination signal can be obtained by carrying out the above described arithmetic operations on the basis of the photo-detection outputs obtained by receiving the fluxes of light reflected from the auxiliary spots that are defocussed and dividing them respectively into central areas and peripheral areas if the light receiving section is formed by a plurality of light receiving elements.

As for the positional relationship between the main spot and the auxiliary spots on the optical disc, it is desirable that, when the main spot is located on a groove section, the auxiliary spots are found on the land section next to the groove section. If arithmetic operations different from those described above are used for obtaining the tracking error signal, it may be so arranged that, when the main spot is located on a groove section, the auxiliary are also found on the groove section. In this case, the polarity of the track discrimination signal will be inverted.

For the main spot and the auxiliary spots to show the above described positional relationship, it is necessary that the approximate equation below holds true: the approximate equation below holds true:

$$S \approx Pn/2$$

where

S is the absolute value of the distance relative to the main spot in the normal direction of the recording tracks formed on the signal recording surface relative to the man spot, P is the track pitch and n is an integer.

Preferably, the two auxiliary spots are formed at respective positions where the approximate equations below hold true:

$$S \approx +P/2 \text{ and}$$

$$S \approx -P/2.$$

However, note that it is not necessary that the auxiliary spots are formed at symmetric positions relative to the main spot. Then, their positions are expressed the approximate equations:

$$S \approx +nP/2 \text{ and}$$

$$S \approx -mP/2$$

where ∵n>m, n<nm or n=m.

Figure 27:
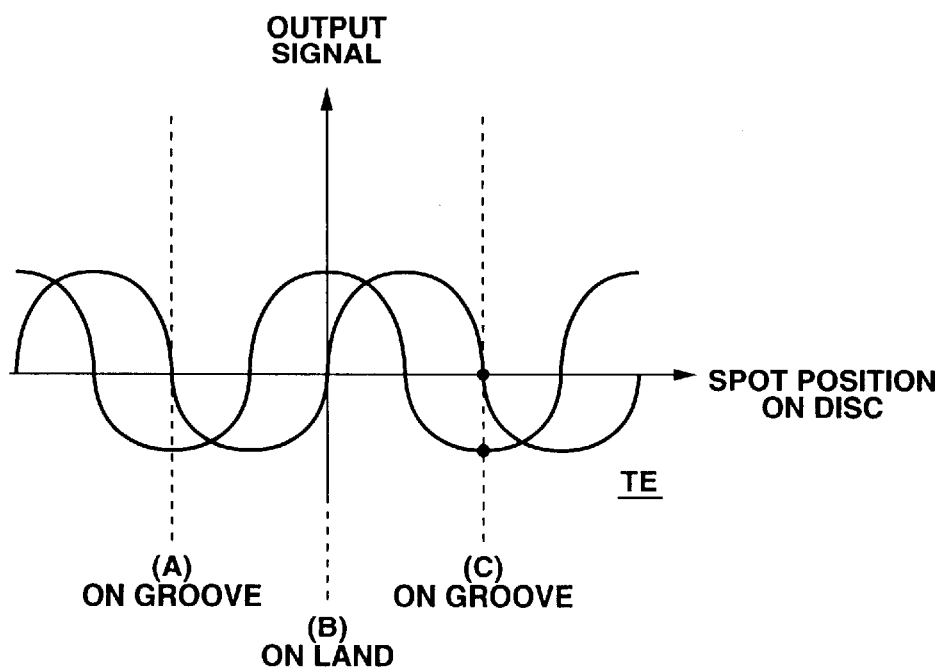
FIG. 27 is a graph showing the track discrimination signal detected by a method of detecting a track discrimination signal according to the invention.
Figure 28:
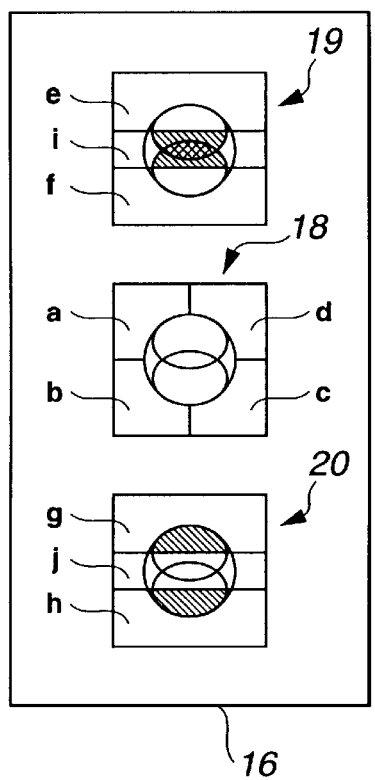
FIG. 28 is a schematic front view of the photo-detection element of an optical pickup device according to the invention, illustrating the light spots on the element as observed when the track discrimination signal takes a minimum value.
Figure 29:
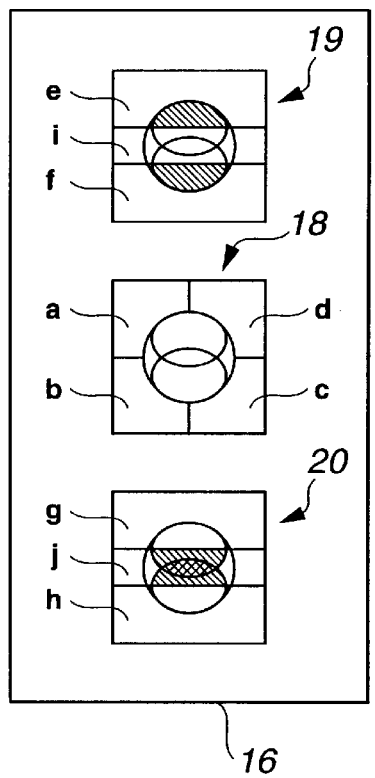
FIG. 29 is a schematic front view of the photo-detection element of an optical pickup device according to the invention, illustrating the light spots on the element as observed when the track discrimination signal takes a maximum value.
Figure 30:
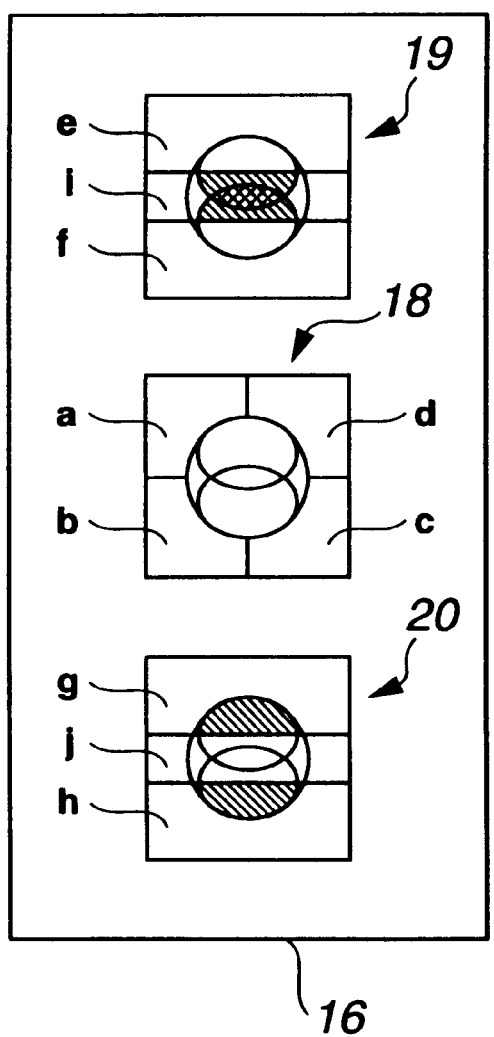
FIG. 30 is a schematic front view of the photo-detection element of an optical pickup device according to the invention, illustrating the light spots on the element as observed when the track discrimination signal takes a minimal value once again.

As shown in FIG. 27, the track discrimination signal (CTS signal) has a phase shifted by (¼) cycles relative to the tracking error signal, provided the distance between a groove section and the next groove section represents a cycle. In the case of (A) and (C) of FIG. 27 where the track discrimination signal is minimized, the intensity of the flux of light coming back from one of the auxiliary spots is high in a central area, whereas that of the flux of light coming back from the other auxiliary spots is high in a peripheral area as shown in FIGS. 28 and 30. Inversely, in the case of (B) of FIG. 27 where the track discrimination signal is maximized, the intensity of the flux of light coming back from one of the auxiliary spots is high in a peripheral area, whereas that of the flux of light coming back from the other auxiliary spots is high in a central area as shown in FIG. 29.

Such a track discrimination signal (CTS signal) can be obtained by the following arithmetic operations. If, for example, a light source having a plurality of light emitting spots is used, only the auxiliary spot of a side may be selected to reduce the number of light emitting spots required for the arithmetic operations. Then, any of the formulas below may be used:

$$CTS=(-i),$$

$$CTS=(e+f) \text{ and}$$

$$CTS=(e+f)-i.$$

However, with any of these formulas, a DC offset can be produced in the track discrimination signal and/or the change in the intensity caused by a land section and the related groove section can be blurred if a slightly defocussed state occurs so that the track discrimination signal will have only a narrow amplitude. A reliable track discrimination signal can be obtained by means of any of the following formulas, using both the first and second auxiliary spots:

$$CTS=(-i)-(-j),$$

$$CTS=(e+f)-(g+h) \text{ and}$$

$$CTS=[(e+f)-i]-k\cdot[(g+h)-j].$$

Note that k in the last fomula is used to avoid the influence of the depth of the groove and that of a slight displacement and a slight difference in the quantity of light of the virtual light emitting spots formed by the hologram pattern.

Figure 26:
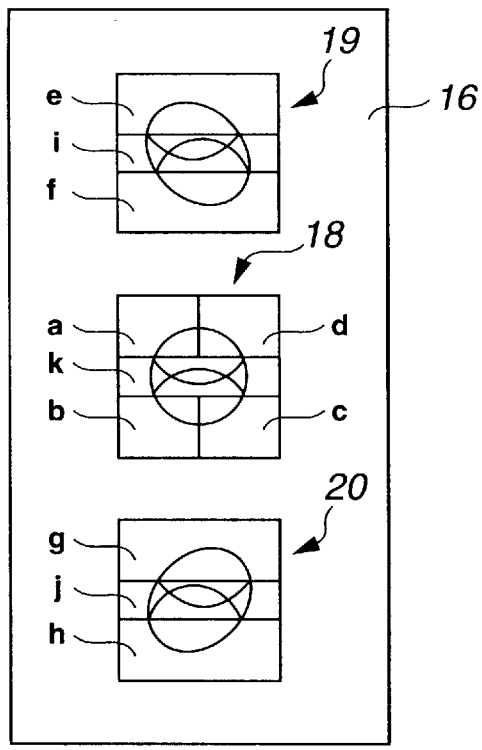
FIG. 26 is a schematic front view of the modified photo-detection element of an optical pickup device according to the invention, illustrating the light spots on the element.

The main light receiving section 18 may comprise a light receiving element adapted to receive only a central area of the flux of light coming back from the main spot in addition to the four light receiving elements as shown in FIG. 26. With such an arrangement, if light beams of '1 degrees overlap each other to raise the intensity of light and move a light spot, any fluctuations in the focus error signal due to the movement of the light spot can successfully be avoided.

Thus, by generating a track discrimination signal in the above described manner, various tracking control methods that have been conventionally used for the "land recording system" and the "groove recording system" can also be used for the "land/groove recording system" that uses an optical disc where the land sections and the groove sections have a substantially same width.

More specifically, the operation of drawing the tracking servo and that of counting the number of tracks to be crossed can be realized by using a track discrimination signal obtained in a manner as described above as a "CPI signal" that is used for conventional tracking control operations. A "CPI signal" is a signal whose phase is shifted by ¼ periods relative to the tracking error signal and that is used conventionally for the "land recording system" and the "groove recording system" for the purpose of drawing the tracking servo and counting the number of tracks to be crossed.

As described above, with an optical pickup device, an optical disc apparatus and a track discrimination signal detection method according to the invention, it is now possible to obtain a desired track discrimination signal with a simple device configuration even when a "land/groove recording medium" is used for "land/groove recording".

While the optical components and the optical elements are provided separately in the above description, an optical pickup device and an optical disc apparatus according to the invention are not limited to such an arrangement and, alternatively, the optical components and the optical elements may be integrally formed for the purpose of the invention. Furthermore, while an "astigmatic method" is used for the detection of a focus error signal in the above description, the present invention is by no means limited thereto and a so-called "spot size method" or a "knife edge method" may alternatively be used for the purpose of the invention.

While the intensity distribution of the defocussed spots is remarkable and therefore a track discrimination signal having a large amplitude will be obtained if the track pitch is such that the light beam of 0 degree and those of ±1 degree completely overlap. However, the present invention is by no means limited thereto and, according to the invention, it is also possible to obtain a track discrimination signal by carrying out arithmetic operations similar to those described above if the zero order diffracted light beam and the + first order diffracted light beams do not completely overlap.

What is claimed is:

1. An optical pickup device comprising:
   a light source having at least a spot for emitting a flux of light;
   an objective lens for converging the flux of light on the signal recording surface of an optical recording medium having a series of helical or coaxial alternating lands and grooves defining a track pitch and irradiating the signal recording surface with the flux of light; and
   a photo-detection means for receiving the flux of light reflected from the signal recording surface of the optical recording medium;
   the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot by an amount equal to a multiple of one-half of the track pitch; and
   the auxiliary flux of light travelling a distance between the objective lens and the focussed point thereof different from that of the main flux of light.

2. The optical pickup device according to claim 1, wherein
   a pair of auxiliary spots are formed at respective positions where the following approximate equations respectively hold true:

$s=+P/2$ and $s=-P/2$, where s is the distance relative to the main spot in the normal direction of the recording tracks formed on the signal recording surface relative to the man spot and P is the track pitch.

3. The optical pickup device according to claim 1, wherein the light source has two or more than two light emitting spots and the flux of light emitted from one of the light emitting spots operates as main flux of light for forming a main spot and the remaining light emitting spots operate as auxiliary fluxes of light for forming auxiliary spots.

4. The optical pickup device according to claim 1, wherein the light source has only a single light emitting spot and the flux of light emitted from the light emitting spot operates as main flux of light for forming a main spot and also as auxiliary fluxes of light for forming auxiliary spots.

5. The optical pickup device according to claim 4, wherein the means for forming the auxiliary spots is an optical diffraction element.

6. The optical pickup device according to claim 5, wherein the optical diffraction element is a polarizing hologram element.

7. The optical pickup device according to claim 1, wherein
   the photo-detection means has a main light receiving section for receiving the reflected main flux of light produced by the main flux of light as reflected by the signal recording surface of the optical recording medium and auxiliary light receiving sections for receiving the reflected auxiliary fluxes of light produced by the auxiliary fluxes of light as reflected by the signal recording surface;
   each of the auxiliary light receiving sections being formed by a plurality of light receiving elements adapted to independently output respective photo-detection signals, the reflected auxiliary fluxes of light being divided by these light receiving elements;
   each of said light receiving elements being adapted to output a plurality of photo-detection signals, a track discrimination signal being generated through additions and subtractions of any of the photo-detection signals.

8. The optical pickup device according to claim 7, wherein the plurality of light receiving elements of the auxiliary light receiving sections are arranged in a direction perpendicular to the far field image of the recording tracks.

9. The optical pickup device according to claim 1, wherein
   a pair of auxiliary spots are formed and
   one of the auxiliary fluxes of light for forming one of the auxiliary spots is adapted to show a focussed point at a position nearer to the objective lens than that of the main flux of light while the other auxiliary flux of light for forming the other auxiliary spot is adapted to show a focused point at a position more remote from the objective lens than that of the main flux of light.

10. The optical pickup device according to claim 9, wherein
    the photo-detection means has a main light receiving section for receiving the reflected main flux of light produced by the main flux of light as reflected by the signal recording surface of the optical recording medium and a pair of auxiliary light receiving sections for receiving the reflected auxiliary fluxes of light produced by the auxiliary fluxes of light as reflected by the signal recording surface;
    each of the pair of auxiliary light receiving sections being formed by a plurality of light receiving elements adapted to independently output respective photo-detection signals, the reflected auxiliary fluxes of light being divided by these light receiving elements;

each of said light receiving elements being adapted to output a plurality of photo-detection signals, a track discrimination signal being generated through additions and subtractions of any of the photo-detection signals.

11. The optical pickup device according to claim 10, wherein the plurality of light receiving elements of each of the auxiliary light receiving sections are arranged in a direction perpendicular to the far field image of the recording tracks.

12. An optical disc apparatus comprising:
   an optical pickup device in order to at least one of write an information signal to and read an information signal from an optical recording medium; and
   a servo circuit for controlling the output signal of the optical pickup device;
   the optical pickup device including:
      a light source having at least a spot for emitting a flux of light;
      an objective lens for converging the flux of light on the signal recording surface of an optical recording medium having a series of helical or coaxial alternating lands and grooves defining a track pitch and irradiating the signal recording surface with the flux of light; and
      a photo-detection means for receiving the flux of light reflected from the signal r surface of the optical recording medium;
      the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot by an amount equal to a multiple of one-half of the track pitch; and
      the auxiliary flux of light travelling a distance between the objective lens and the focal point different from the main flux of light.

13. The optical disc apparatus according to claim 12, wherein
   a pair of auxiliary spots are formed at respective positions where the following approximate equations respectively hold true:

$s=+P/2$ and $s=-P/2$, where s is the distance relative to the main spot in the normal direction of the recording tracks formed on the signal recording surface relative to the man spot and P is the track pitch.

14. The optical disc apparatus according to claim 12, wherein the light source has two or more than two light emitting spots and the flux of light emitted from one of the light emitting spots operates as main flux of light for forming a main spot and the remaining light emitting spots operate as auxiliary fluxes of light for forming auxiliary spots.

15. The optical disc apparatus according to claim 12, wherein the light source has only a single light emitting spot and the flux of light emitted from the light emitting spot operates as main flux of light for forming a main spot and also as auxiliary fluxes of light for forming auxiliary spots.

16. The optical disc apparatus according to claim 15, wherein the means for forming the auxiliary spots is an optical diffraction element.

17. The optical disc apparatus according to claim 16, wherein the optical diffraction element is a polarizing hologram element.

18. The optical disc apparatus according to claim 12, further comprising a signal processing circuit for generating a replay signal on the basis of the output signal of the optical pickup device;
   wherein the photo-detection means has a main light receiving section for receiving the reflected main flux of light produced by the main flux of light as reflected by the signal recording surface of the optical recording medium and auxiliary light receiving sections for receiving the reflected auxiliary fluxes of light produced by the auxiliary fluxes of light as reflected by the signal recording surface;
   wherein each of the auxiliary light receiving sections being formed by a plurality of light receiving elements adapted to independently output respective photo-detection signals, the reflected auxiliary fluxes of light being divided by these light receiving elements;
   wherein each of said light receiving elements being adapted to output a plurality of photo-detection signals, a track discrimination signal being generated through additions and subtractions of any of the photo-detection signals.

19. The optical disc apparatus according to claim 18, wherein the tracking servo controls the drawing operation by using the track discrimination signal and the tracking error signal.

20. The optical disc apparatus according to claim 18, wherein the operation of counting the number of tracks to be crossed and the direction of crossing tracks is conducted by using the track discrimination signal and the tracking error signal.

21. The optical disc apparatus according to claim 18, wherein the plurality of light receiving elements of each of the auxiliary light receiving sections are arranged in a direction perpendicular to the far field image of the recording tracks.

22. The optical disc apparatus according to claim 12, wherein
   a pair of auxiliary spots are formed and
   one of the auxiliary fluxes of light for forming one of the auxiliary spots is adapted to show a focussed point at a position nearer to the objective lens than that of the main flux of light while the other auxiliary flux of light for forming the other auxiliary spot is adapted to show a focussed point at a position more remote from the objective lens than that of the main flux of light.

23. The optical disc apparatus according to claim 22, wherein
   the photo-detection means has a main light receiving section for receiving the reflected main flux of light produced by the main flux of light as reflected by the signal recording surface of the optical recording medium and a pair of auxiliary light receiving sections for receiving the reflected auxiliary fluxes of light produced by the auxiliary fluxes of light as reflected by the signal recording surface;
   each of the pair of auxiliary light receiving sections being formed by a plurality of light receiving elements adapted to independently output respective photo-deter ion signals, the reflected auxiliary fluxes of light being divided by these light receiving elements;
   each of said light receiving elements being adapted to output a plurality of photo-detection signals, a track discrimination signal being generated through additions and subtractions of any of the photo-detection signals.

24. The optical disc apparatus according to claim 23, wherein the plurality of light receiving elements of each of the auxiliary light receiving sections are arranged in a direction perpendicular to the far field image of the recording tracks.

25. A method of detecting a track discrimination signal in an operation of reading an information signal from an optical recording medium by means of an optical pickup device;

said optical pickup device comprising:
- a light source having at least a spot for emitting a flux of light;
- an objective lens for converging the flux of light on the signal recording surface of an optical recording medium having a series of helical or coaxial alternating lands and grooves defining a track pitch and irradiating the signal recording surface with the flux of light; and
- a photo-detection means for receiving the flux of light reflected from the signal recording surface of the optical recording medium;
- the flux of light emitted from the light source producing a main flux of light for forming a main spot on the signal recording surface of the optical recording medium for the purpose of recording and/or reproducing an information signal and an auxiliary flux of light for forming an auxiliary spot on the signal recording surface of the optical recording medium at a position separated from the main spot by an amount equal to a multiple of one-half of the track pitch; and
- the auxiliary flux of light travelling a distance between the objective lens and the focal point different from the main flux of light.

26. The method of detecting a track discrimination signal according to claim 25, wherein
a pair of auxiliary spots are formed at respective positions where the following approximate equations respectively hold true:

$$s = \pm P/2 \text{ and}$$

$$s = -P/2,$$

where s is the distance relative to the main spot in the normal direction of the recording tracks formed on the signal recording surface relative to the man spot and P is the track pitch.

27. The method of detecting a track discrimination signal according to claim 25, wherein the light source has two or more than two light emitting spots and the flux of light emitted from one of the light emitting spots operates as main flux of light for forming a main spot and the remaining light emitting spots operate as auxiliary fluxes of light for forming auxiliary spots.

28. The method of detecting a track discrimination signal according to claim 25, wherein the light source has only a single light emitting spot and the flux of light emitted from the light emitting spot operates as main flux of light for forming a main spot and also as auxiliary fluxes of light for forming auxiliary spots.

29. The method of detecting a track discrimination signal according to claim 28, wherein the means for forming the auxiliary spots is an optical diffraction element.

30. The method of detecting a track discrimination signal according to claim 29, wherein the optical diffraction element is a polarizing hologram element.

31. The method of detecting a track discrimination signal according to claim 25, wherein
the photo-detection means has a main light receiving section for receiving the reflected main flux of light produced by the main flux of light as reflected by the signal recording surface of the optical recording medium and auxiliary light receiving sections for receiving the reflected auxiliary fluxes of light produced by the auxiliary fluxes of light as reflected by the signal recording surface;

each of the auxiliary light receiving sections being formed by a plurality of light receiving elements adapted to independently output respective photo-detection signals, the reflected auxiliary fluxes of light being divided by these light receiving elements; and each of said light receiving elements being adapted to output a plurality of photo-detection signals, a track discrimination signal being generated through additions and subtractions of any of the photo-detection signals.

32. The method of detecting a track discrimination signal according to claim 31, wherein the tracking servo controls the drawing operation by using the track discrimination signal and the tracking error signal.

33. The method of detecting a track discrimination signal according to claim 31, wherein the operation of counting the number of tracks to be crossed and the direction of crossing tracks is conducted by using the track discrimination signal and the tracking error signal.

34. The method of detecting a track discrimination signal according to claim 31, wherein the plurality of light receiving elements of each of the auxiliary light receiving sections are arranged in a direction perpendicular to the far field image of the recording tracks.

35. The method of detecting a track discrimination signal according to claim 25, wherein
a pair of auxiliary spots are formed and
one of the auxiliary fluxes of light for forming one of the auxiliary spots is adapted to show a focussed point at a position nearer to the objective lens than that of the main flux of light while the other auxiliary flux of light for forming the other auxiliary spot is adapted to show a focussed point at a position more remote from the objective lens than that of the main flux of light.

36. The method of detecting a track discrimination signal according to claim 35, wherein
the photo-detection means has a main light receiving section for receiving the reflected main flux of light produced by the main flux of light as reflected by the signal recording surface of the optical recording medium and a pair of auxiliary light receiving sections for receiving the reflected auxiliary fluxes of light produced by the auxiliary fluxes of light as reflected by the signal recording surface;

each of the pair of auxiliary light receiving sections being formed by a plurality of light receiving elements adapted to independently output respective photo-detection signals, the reflected auxiliary fluxes of light being divided by these light receiving elements; and each of said light receiving elements being adapted to output a plurality of photo-detection signals, a track discrimination signal being generated through additions and subtractions of any of the photo-detection signals.

37. The method of detecting a track discrimination signal according to claim 36, wherein the plurality of light receiving elements of each of the auxiliary light receiving sections are arranged in a direction perpendicular to the far field image of the recording tracks.

38. The optical pickup device according to claim 1, wherein the auxiliary spot being formed at a position expressed by $$S=Pn/2,$$

S being the absolute value of the distance relative to the main spot in the normal direction of the recording tracks formed on the signal recording surface relative to the main spot, P being the track pitch, n being an integer.

39. The optical disc apparatus according to claim 12, wherein the auxiliary spot is formed at a position expressed by $$S=Pn/2,$$

S being the absolute value of the distance relative to the main spot in the normal direction of the recording tracks formed on the signal recording surface relative to the main spot, P being the track pitch, n being an integer.

40. The method of detecting a track discrimination signal according to claim 25, wherein the auxiliary spot is formed at a position expressed by $$S=Pn/2,$$

S being the absolute value of the distance relative to the main spot in the normal direction of the recording tracks formed on the signal recording surface relative to the main spot, P being the track pitch, n being an integer;

the track discrimination signal being generated on the basis of the output signal of the photo-detection means.

* * * * *